(12) United States Patent
Mamedov et al.

(10) Patent No.: US 8,609,738 B2
(45) Date of Patent: Dec. 17, 2013

(54) PROCESS FOR PRODUCING A MIXTURE OF ALIPHATIC AND AROMATIC HYDROCARBONS

(75) Inventors: Agaddin Mamedov, Sugar Land, TX (US); Saleh Al-Sayari, Najran (SA)

(73) Assignee: Saudi Basic Industries Corporation, Riyadh (SA)

( * ) Notice: Subject to any disclaimer, the term of this patent is extended or adjusted under 35 U.S.C. 154(b) by 160 days.

(21) Appl. No.: 13/256,518

(22) PCT Filed: Mar. 15, 2010

(86) PCT No.: PCT/EP2010/001617
§ 371 (c)(1), (2), (4) Date: Nov. 8, 2011

(87) PCT Pub. No.: WO2010/105786
PCT Pub. Date: Sep. 23, 2010

(65) Prior Publication Data
US 2012/0123001 A1    May 17, 2012

(30) Foreign Application Priority Data
Mar. 16, 2009 (EP) .................................. 09075118

(51) Int. Cl.
C07C 27/00 (2006.01)
(52) U.S. Cl.
USPC ............ 518/702; 518/700; 518/704; 518/715
(58) Field of Classification Search
USPC .................................. 518/700, 702–704, 715
See application file for complete search history.

(56) References Cited

U.S. PATENT DOCUMENTS

| 4,177,203 | A | 12/1979 | Kolbel et al. | |
| 4,619,947 | A * | 10/1986 | Jackson | 518/716 |
| 2003/0010677 | A1 * | 1/2003 | Schinski | 208/58 |
| 2003/0045591 | A1 * | 3/2003 | O'Rear | 518/706 |
| 2004/0198845 | A1 | 10/2004 | Wang et al. | |
| 2008/0272340 | A1 | 11/2008 | Koh | |

FOREIGN PATENT DOCUMENTS

| EP | 0269297 A1 | 6/1988 |
| FR | 2878858 A1 | 6/2006 |
| WO | 0043121 A1 | 7/2000 |
| WO | 03016250 A1 | 2/2003 |
| WO | 03031327 A1 | 4/2003 |
| WO | 2006037782 A1 | 4/2006 |
| WO | 2006097440 A1 | 9/2006 |
| WO | 2007028153 A2 | 3/2007 |

OTHER PUBLICATIONS

French Patent No. 2878858 (A1); Publication Date: Jun. 9, 2006; Abstract Only; 1 Page.
Bi et al.; "Selective Production of C4 Hydrocarbons from Syngas Using Fe—Co/ZrO2 and SO42-/ZrO2 Catalysts"; The Canadian Journal of Chemical Engineering; vol. 81; Apr. 2003; pp. 230-242.
Commereuc et al.; Catalytic Synthesis of Low Molecular Weight Olefins from CO and H2 with Fe(CO)5, Fe3(CO)12, and [HFe3(CO)11]—Supported on Inorganic Oxides; J.C.S. Chem. Comm.; 1980; pp. 154-155.
Kaneko et al.; "Coal Liquefaction"; Ullmann's Encyclopedia of Industrial Chemistry; vol. 9; 2012; pp. 311-389.
Mortola et al.; "The Performance of Pt/CeZrO2/Al2O3 Catalysts on the Partial Oxidation and Autothermal Reforming of Methane"; Natural Gas Conversion VIII; 2007; pp. 409-414.
Okuhara et al.; Synthesis of Light Olefins from CO and H2 over Highly Dispersed Ru/K—Al2O3 Derived from Ru3(CO)12; J.C.S. Chem. Comm.; 1981; pp. 1114-1115.
Passos et al.; "Partial Oxidation of Methane to Synthesis Gas on Pt/CexZr1-xO2 Catalysts: The Effect of the Support Reducibility and of teh Metal Dispersion on the Stability of the Catalysts"; Catalysis Today; vol. 101; 2005; pp. 23-30.
International Search Report; International Application No. PCT/EP2010/001617; International Filing Date: Mar. 15, 2010; Date of Mailing: Jun. 17, 2010; 4 Pages.
Written Opinion of the International Searching Authority; International Application No. PCT/EP2010/001617; International Filing Date: Mar. 15, 2010; Date of Mailing: Jun. 17, 2010; 5 Pages.
Souza et al.; "Autothermal Reforming of Methane Over Nickel Catalysts Prepared from Hydrotalcite-Like Compounds"; Natural Gas Conversion VIII; 2007; pp. 451-456.

* cited by examiner

Primary Examiner — Jafar Parsa
(74) Attorney, Agent, or Firm — Cantor Colburn LLP

(57) ABSTRACT

The present invention relates to a process for producing aliphatic and aromatic C2-C6 hydrocarbons by submitting a reformed gas to Fischer-Tropsch synthesis. The reformed gas used in the present process is produced by autothermal dry reforming of a hydrocarbon feed over a Ni/La catalyst and essentially consists of syngas ($H_2$ and CO), oxygen ($O_2$) and optionally a further component selected from the group consisting of methane ($CH_4$), carbon dioxide ($CO_2$) and inert gas.

16 Claims, No Drawings

PROCESS FOR PRODUCING A MIXTURE OF ALIPHATIC AND AROMATIC HYDROCARBONS

CROSS REFERENCE TO RELATED APPLICATION

This application is a 371 of International Application No. PCT/EP2010/001617, filed Mar. 15, 2010, which claims priority to European Application No. 09075118.1, filed Mar. 16, 2009, both of which are hereby incorporated by reference in its entirety.

TECHNICAL FIELD

The present invention relates to a process for producing a product stream comprising a mixture of aliphatic and aromatic C2-C6 hydrocarbons by Fischer-Tropsch synthesis wherein a Fischer-Tropsch catalyst is contacted with syngas produced by reforming a hydrocarbon feed.

BACKGROUND ART

It has been previously described that a hydrocarbon feed such as methane can be converted into a product stream comprising more complex hydrocarbons by a process wherein the hydrocarbon feed is first reformed to synthesis gas (syngas) followed by a second step wherein said syngas is converted into a hydrocarbon product stream by Fischer-Tropsch synthesis (F-T synthesis).

In WO 03/016250, for instance, such a process is described wherein first a mixture of a hydrocarbon feedstock and steam is subjected to catalytic steam reforming to produce a primary reformed gas, which then is partially combusted with an oxygen-containing gas over a secondary reforming catalyst to produce syngas. Said syngas is used to synthesize hydrocarbons by F-T synthesis. The process according WO 03/016250 is characterized in that the tail gas obtained in the F-T synthesis step is recycled to the primary reformed gas.

In FR 2878858 a combined process for producing hydrocarbons is described that comprises a reforming step wherein a hydrocarbon feedstream is converted into syngas and a F-T synthesis step wherein the produced syngas is converted into a hydrocarbon product stream. The syngas in FR 2878858 is preferably produced by a technology that employs oxygen, such as catalytic autothermal reforming or (catalytic) partial oxidation.

In WO 2006/097440 a process to prepare a F-T synthesis product is described in which a syngas mixture is prepared by (a) pre-reforming a hydrocarbon feed to produce a mixture of methane, hydrogen and carbon dioxide; (b) heating of the mixture obtained in (a) to above 650° C.; and (c) performing partial oxidation of the heated mixture of (b) with a source of oxygen.

A drawback of conventional processes for producing hydrocarbons that combine a reforming step and an F-T synthesis step is the non-selective production of carbon dioxide and methane in the F-T synthesis step. This leads to a relatively low C2-C6 hydrocarbon selectivity and renders the process not economical.

The technical problem underlying the present invention is the provision of a process for converting methane ($CH_4$) to a mixture of aliphatic and aromatic C2-C6 hydrocarbons that has an improved selectivity for aliphatic and aromatic C2-C6 hydrocarbons.

DISCLOSURE OF INVENTION

The solution to the above problem is achieved by providing the process as described herein below and as characterized in the claims.

Accordingly, the present invention provides a process for producing a product stream comprising a mixture of aliphatic and aromatic C2-C6 hydrocarbons by Fischer-Tropsch synthesis, wherein said process comprises contacting a Fischer-Tropsch catalyst with a reformed gas that is produced by autothermal dry reforming of a hydrocarbon feed in the presence of a reforming catalyst and wherein said reformed gas essentially consists of syngas ($H_2$ and CO), oxygen ($O_2$) and optionally a further component selected from the group consisting of methane ($CH_4$), carbon dioxide ($CO_2$) and inert gas.

In the context of the present invention, it was surprisingly found that the C2-C6 hydrocarbon selectivity of a Fischer-Tropsch synthesis reaction can be significantly increased in case the feedstream of said Fischer-Tropsch synthesis reaction comprises molecular oxygen ($O_2$). As a result thereof, the loss of carbon atoms in the form of carbon dioxide can be reduced, which greatly increases the carbon efficiency of the Fischer-Tropsch synthesis process. This effect is highly surprising since it is taught in the prior art that the oxygen content of a Fischer-Tropsch synthesis feedstock should be reduced, preferably to below 1000 ppm; see e.g. US 2004/0198845.

Accordingly, the present invention provides a process for producing aliphatic and aromatic C2-C6 hydrocarbons comprising:

(a) a "reforming step", wherein a "reformed gas" as defined herein is produced by autothermal dry reforming of a hydrocarbon feed in the presence of a "reforming catalyst"; and (b) a "Fischer-Tropsch synthesis step", wherein a "Fischer-Tropsch catalyst" is contacted with the "reformed gas" produced in (a) under process conditions allowing Fischer-Tropsch synthesis.

The "reformed gas" employed in the process of the present invention essentially consists of syngas ($H_2$ and CO), oxygen ($O_2$) and optionally a further component selected from the group consisting of methane ($CH_4$), carbon dioxide ($CO_2$) and inert gas.

Preferably, the "reformed gas" of the present invention comprises at least 0.1% mole $O_2$, more preferably at least 0.2% mole $O_2$, even more preferably at least 0.3% mole $O_2$ and particularly preferably at least 0.35% mole $O_2$. Furthermore, the "reformed gas" of the present invention preferably comprises not more than 5% mole $O_2$, more preferably not more than 2.5% mole $O_2$ and even more preferably not more than 1% mole $O_2$ and particularly preferably not more than 0.5% mole $O_2$. Most preferably, the reformed gas used in the process of the present invention comprises about 0.4% mole oxygen ($O_2$).

The term "inert gas" as used herein relates to any element that is in gas phase under the conditions in which the Fischer-Tropsch catalyst is contacted with the reformed gas and which does not participate in and/or interfere with the Fischer-Tropsch synthesis reaction. Accordingly, the "inert gas" that may be present in the reformed gas can act as an inert diluent of the remaining gas components of the reformed gas. Preferably, the inert gas is nitrogen ($N_2$).

The main constituent of the "reformed gas" employed in the process of the present invention preferably is synthesis gas (syngas; a mixture of $H_2$ and CO). Accordingly, the reformed gas of the present invention comprises at least 50% mole and preferably at least 55% mole syngas. Yet, it is evident for the skilled artisan that the Fischer-Tropsch synthesis step may be performed using a "reformed gas" having even a higher percentage of syngas.

Preferably, the reformed gas used in the process of the present invention has a hydrogen ($H_2$) to carbon monoxide (CO) ratio of at least 1, more preferably of at least 1.2, even more preferably of at least 1.4 and particularly preferably of at least 1.6, but preferably of not more than 4, more preferably of not more than 3, even more preferably of not more than 2 and particularly preferably of not more than 1.8. Most preferably, the "reformed gas" has a $H_2$ to CO ratio of at least 1.6 but not more than 1.8 ($H_2$ to CO ratio of 1.6-1.8).

The reformed gas of the present invention is produced by catalytic autothermal dry reforming of a hydrocarbon feed in the presence of a reforming catalyst.

The hydrocarbons comprised in the hydrocarbon feed may include gaseous hydrocarbons such as methane, natural gas or liquefied petroleum gas (LPG), but also more heavy hydrocarbons such as C6+ hydrocarbons. In one embodiment, the hydrocarbons feed comprises unwanted side products produced by a Fisher-Tropsch synthesis reaction. Preferably, the main hydrocarbon constituent comprised in the hydrocarbon feed of the process of the present invention is methane. In the context of the present invention, the term "main hydrocarbon constituent" means that a given hydrocarbon constitutes more than 50% mole of all comprised hydrocarbons, more preferably more than 60% mole of all comprised hydrocarbons, even more preferably more than 70% mole of all comprised hydrocarbons, and most preferably of more than 75% mole of all comprised hydrocarbons. Accordingly a particularly preferred process for producing the syngas comprised in the reformed gas of the present invention is catalytic autothermal dry reforming of methane (ATDRM).

By contacting a mixture of methane ($CH_4$), oxygen ($O_2$) and carbon dioxide ($CO_2$) with a suitable catalyst, endothermic dry reforming and exothermic methane oxidation can be performed in a single regime, which represents an effective means to decrease the energy consumption during syngas synthesis, see for example MORTOLA, et al. The performance of Pt/CeZrO2/$Al_2O_3$ catalysts on the partial oxidation and autothermal reforming of methane Edited by NORONHA, et al. Elsevier, 2007. p. 409-414. A further advantage of ATDRM is that the $H_2$/CO ratio of the produced syngas composition is approximately 1.4-1.8, which is highly advantageous for the use in F-T synthesis.

Autothermal dry reforming of the hydrocarbon feed is performed in the presence of a "reforming catalyst". Reforming catalysts useful for catalysing autothermal dry reforming of a hydrocarbon feed have been previously described; see e.g. MORTOLA, et al. The performance of Pt/CeZrO2/Al2O3 catalysts on the partial oxidation and autothermal reforming of methane. Edited by NORONHA, et al. Elsevier, 2007. p. 409-414. or PASSOS, et al. *Catalysis Today.* 2005, vol. 1, p. 23-30. Other known reforming catalysts include, but are not limited to, Ni/$La_2O_3$ catalyst; Ni/$Al_2O_3$ catalyst; and Ni/MgO—$Al_2O_3$ catalyst. Preferably, the reforming catalyst used in the process of the present invention is a Ni/$La_2O_3$ catalyst. Methods for manufacturing catalysts useful for autothermal dry reforming of hydrocarbons are known in the art; see e.g. WO 00/43121 or SOUZA, et al. Autothermal reforming of methane over nickel catalysts prepared from hydrotalcite-like compounds. Edited by NORONHA, et al. Elsevier, 2007. p. 451-456.

Most preferably an in situ prepared Ni/$La_2O_3$ reforming catalyst is used in the process of the present invention. The term "in situ prepared" means that the catalyst is prepared in a catalyst enclosure that is either already situated in the process installation wherein the autothermal dry reforming process is to be performed or that the catalyst is prepared in a catalyst enclosure which can be directly placed into said process installation. An "in situ prepared Ni/$La_2O_3$ catalyst" can be prepared as follows: $La_2O_3$ particles are placed in the final catalyst enclosure. The catalyst comprising the support is then fed with a heated, methane-comprising gaseous mixture (e.g. $CH_4+O_2+CO_2$ heated to 450° C.-500° C.) to stabilize the support. Subsequently, the support is impregnated with a Ni-salt solution until the catalyst composition comprises a specific amount of Ni. Preferably, the in situ-prepared Ni/$La_2O_3$ catalyst comprises 3-5 mass % Ni. Preferably, the used Ni-salt is Ni($NO_3$)$_2$. Following the impregnation step the temperature of the gaseous mixture fed to the catalyst comprising the support is increased (e.g. to 660° C.-700° C.). As a consequence the Ni-oxide comprised in the impregnated $La_2O_3$ particles are reduced by the comprised methane. As exemplified herein, the resultant "in situ prepared Ni/$La_2O_3$ catalyst" is useful in a process for autothermal dry reforming of a hydrocarbon feed, e.g. to produce syngas from methane.

Accordingly, a feedstream comprising $CH_4$, $O_2$ and $CO_2$ may be converted by catalytic autothermal dry reforming by contacting said feedstream with an in situ prepared Ni/$La_2O_3$ catalyst at a reaction temperature of e.g. about 710° C. to produce a reformed gas that approximately comprises 22% mole CO, 35% mole $H_2$ and 0.4% mole $O_2$.

The "reformed gas" produced by reforming hydrocarbons is used as a feed for F-T synthesis. F-T synthesis is a well known catalyzed chemical reaction in which synthesis gas (syngas), a mixture of carbon monoxide and hydrogen, is converted into a complex mixture of hydrocarbon compounds by contacting syngas with a F-T catalyst under F-T synthesis conditions; see e.g. KANEKO TAKAO, et al. Ullmann's Encyclopedia of Industrial Chemistry. 7th edition. John Wiley, 1997. p. 17-31.

The most common catalysts useful in F-T synthesis ("F-T catalysts") are based on Fe and/or Co, although Ni- and Ru-based catalysts have also been described; see e.g. U.S. Pat. No. 4,177,203; COMMEREUC, et al. *J. Chem. Soc., Chem. Commun.* 1980, p. 154-155; OKUHARA, et al. *J. Chem. Soc., Chem. Commun.* 1981, p. 1114-1115. Generally, Ni-based catalysts are relatively more selective for producing methane whereas Co-, Fe- and Ru-based catalysts are more selective for hydrocarbons having at least two carbon atoms (C2+ hydrocarbons). Moreover, the selectivity for C2+ hydrocarbons can be increased by decreasing the $H_2$/CO ratio, decreasing the reaction temperature and decreasing the reactor pressure. It is evident that Fischer-Tropsch catalysts which are sensitive to oxygen poisoning are not suitable for use in the process of the present invention. Such non-suitable Fischer-Tropsch catalysts are characterized in that they comprise elements with high redox properties such as Mn, Cr, Mo, Cu and V. It is well within the scope of the skilled artisan to determine whether a known Fischer-Tropsch catalyst is sensitive to oxygen poisoning e.g. by measuring Fisher-Tropsch catalyst activity over time in the presence and absence of molecular oxygen in the feedstream of the Fischer-Tropsch synthesis process.

The Fischer-Tropsch catalyst that is preferably used in the process of the present invention is a cobalt-iron bi-component oxide (Co—Fe—O) catalyst. The cobalt-iron bi-component oxide may be supported on an inert support. Suitable inert supports are known in the art and include alumina ($Al_2O_3$), silica ($SiO_2$), titania ($TiO_2$), zirconia ($ZrO_2$) and magnesia (MgO), and mixtures thereof. Preferably the cobalt-iron bi-component oxide is supported on silica ($SiO_2$). Such a Co—Fe—O/SiO$_2$ catalyst is described in e.g. YONGHONG B I, et al. *The Canadian Journal of Chemical Engineering.* 2003, vol. 81, p. 230-242.

The Fischer-Tropsch synthesis reaction is typically performed at a reaction temperature of 275-350° C. and a total space velocity of the syngas of 400-1200 h$^{-1}$.

The product stream of the process of the present invention comprises aliphatic and aromatic C2-C6 hydrocarbons. As used herein, the term "C2-C6 hydrocarbon" relates to an organic compound having two to six carbon atoms. Accordingly, the product stream of the process of the present invention comprises aliphatic and aromatic hydrocarbons having two to six carbon atoms. Yet, it is evident for the skilled person that also other organic compounds including toluene and xylene may be produced in a Fischer-Tropsch synthesis reaction in small amounts and, thus, may be comprised in the product stream.

One specific further hydrocarbon produced in the Fischer-Tropsch synthesis step of the process of the present invention is methane (CH$_4$). Preferably, said methane, optionally together with the carbon dioxide (CO$_2$) that is comprised in the product stream, is recycled to the hydrocarbon feed from which the reformed gas is produced. In addition thereto, also other hydrocarbons comprised in the Fischer-Tropsch synthesis product stream may be separated from said product stream and recycled to the "hydrocarbon feed" of the reforming step that produces the reformed gas. Yet, it is evident that only hydrocarbons are recycled to the reforming step which can be reformed to syngas under the given process conditions of the reforming step in order to prevent the build-up of certain unwanted hydrocarbons. Accordingly, certain aliphatic and aromatic C2-C6 hydrocarbons may be separated from the product stream of the Fischer-Tropsch synthesis process step and the remaining components of the Fischer-Tropsch product stream (optionally including the comprised carbon dioxide) may be partially or completely recycled to the feedstream of the reforming step.

MODE(S) FOR CARRYING OUT THE INVENTION

The present invention will now be more fully described by the following non-limiting

EXAMPLES

Example 1

The reforming catalyst "3% Ni/La$_2$O$_3$ in situ" for autothermal dry reforming of methane was prepared as follows: 2 ml La$_2$O$_3$ of particle size 25-40 mesh were loaded in a tubular quartz reactor with an inner diameter of 12 mm and a length of 45 cm. The loaded reactor was fed with a gaseous mixture consisting of approximately 28.4% mole CH$_4$+11% mole O$_2$+17.4% mole CO$_2$+42.8% mole N$_2$ at 450° C. After treatment of the support with reaction mixture (less than 24 hours) to obtain a stable phase composition, impregnation of the La$_2$O$_3$ support with a 0.1-0.3% Ni(NO$_3$)$_2$ solution in water was started, by injecting the Ni(NO$_3$)$_2$ solution into the gas stream to gradually impregnate the La$_2$O$_3$ support with the Ni salt. The Ni(NO$_3$)$_2$ impregnation of the La$_2$O$_3$ support was continued until the calculated amount of 3 mass % Ni/La$_2$O$_3$ basis was reached. Formation of NO$_2$ was observed during the Ni(NO$_3$)$_2$ impregnation step, which indicates that oxides of Ni are formed within the La$_2$O$_3$ support.

After completing the Ni(NO$_3$)$_2$ impregnation step, the reaction temperature was increased to 660° C. to reduce the Ni-oxide with the methane containing gaseous mixture. The resultant in situ prepared reforming catalyst "3% Ni/La$_2$O$_3$ in situ" initially fully oxidizes methane to CO$_2$. However after reaching steady state condition the "3% Ni/La$_2$O$_3$ in situ" catalyst forms CO and H$_2$.

A feed stream consisting of approximately 28.4% mole CH$_4$+11% mole O$_2$+17.4% mole CO$_2$+42.8% mole N$_2$ was contacted with the reforming catalyst "3% Ni/La$_2$O$_3$ in situ" at 680-710° C. with a contact time of 0.5 sec to produce Syngas composition A consisting of approximately 21.5% mole CO+35.5% mole H$_2$+34.79% mole N$_2$+6.17% mole CH$_4$+1.55% mole CO$_2$+0.4% mole O$_2$. The catalyst prepared in situ showed stable activity for more than 120 hours, while in a comparative experiment a catalyst prepared by impregnation of La$_2$O$_3$ with Ni salt before loading it into the reactor showed a comparable activity that gradually declined within 50 hours of operation.

A F-T catalyst was prepared as follows: 20.2 g Fe(NO$_3$)$_2$.9H$_2$O was dissolved in 100 ml water, 21.8 g Co(NO$_3$)$_2$.6H$_2$O was dissolved in 150 ml water and 26.5 g Na$_2$CO$_3$ was dissolved in 500 ml water. The Fe and Co solutions were mixed and the resulting mixture of the salts of Fe and Co was precipitated by adding the Na$_2$CO$_3$ solution at pH 6. The ready gel was mixed with 0.11 g SiO$_2$ particles of 40 mesh, and stirred 2 h at 70° C. The precipitate was filtrated and washed to remove the Na from the SiO$_2$+gel. The SiO$_2$ amount to the Fe+Co mixture was 1.5 mass %. The ratio of Fe to Co in the catalyst composition was 40/60. The mixture was dried overnight at 120° C. The ready sample then was calcined at 400° C. for 6 h in air. The resulting catalyst is designated Catalyst 1.

The above mentioned procedure was repeated, except that during the precipitation step the Na$_2$CO$_3$ solution was added at pH 8 and that the catalyst was calcined at a temperature of 600° C. The resulting catalyst is designated Catalyst 2.

A Fischer-Tropsch (F-T) process was carried out in a quartz reactor with an inner diameter of 10 mm loaded with 2 ml Catalyst 1 at a reaction temperature of 273° C. Syngas composition A produced as described herein above is used as a reformed gas feedstream in the F-T synthesis process. The flow rate of the syngas composition was 36 cc/min. The results of this F-T process are described in the column "Syngas A Catalyst 1" of Table 1.

In addition thereto, the F-T process was carried out in the presence of Catalyst 2 under the same process conditions as when using Catalyst 1, with the exception that the reaction temperature was 285° C. The results of this F-T process are described in the column "Syngas A Catalyst 2" of Table 1.

Conversion of CO and selectivity to hydrocarbons were calculated on the basis of carbon balance as follows:

Conversion of CO=moles of CO reacted/moles of CO supplied

Selectivity to hydrocarbons=$n$*moles of hydrocarbons/moles of CO reacted ($n$=number of carbon atoms in hydrocarbons)

Selectivity to CO$_2$=(moles of CO$_2$ out−moles of CO$_2$ in)/moles of CO reacted.

Experiment 2

Comparative

Syngas composition B was produced by a modified methane steam reforming process, including a reversed water gas shift reaction step. Syngas produced by conventional steam reforming (composition of approximately 20.8% mole $CO+18.3\%$ mole $CO_2+60.8\%$ mole $H_2$) was subsequently contacted with a Cr-based industrial Catofin® C4 dehydrogenation catalyst at 600° C. and a contact time of 8 sec, producing Syngas composition B having approximately 29% mole $CO+12\%$ mole $CO_2+59\%$ mole $H_2$.

A Fischer-Tropsch process was carried out as described in Example 1 with the exception that Syngas composition B produced by methane steam reforming as described herein above was used as a feed for the F-T process. The results of this F-T process are described in the column "Syngas B Catalyst 1" of Table 1.

In addition thereto, an F-T process was carried out as in example 1 with the exception that Syngas composition B and Catalyst 2 have been used. The reaction temperature was 285° C. The results of this F-T process are described in the column "Syngas B Catalyst 2" of Table 1.

TABLE 1

|  | Syngas A Catalyst 1 | Syngas A Catalyst 2 | Syngas B Catalyst 1 | Syngas B Catalyst 2 |
| --- | --- | --- | --- | --- |
| CO conversion (% mole) | 87.0 | 80.0 | 88.3 | 84.0 |
| $CH_4$ selectivity (% mole) | 31.5 | 44.0 | 13.7 | 15.5 |
| C1-C6 selectivity (% mole) | 41.6 | 56.0 | 23.8 | 25.5 |
| $CO_2$ selectivity (% mole) | 58.4 | 44.0 | 76.2 | 74.5 |
| C1-C6 yield (% mole) | 36.2 | 44.8 | 21.0 | 21.4 |
| $CO_2$ yield (%) | 50.8 | 35.2 | 67.2 | 62.5 |

As can be derived from Table 1, the C1-C6 selectivity and yield are significantly increased when the feedstream of the Fischer-Tropsch synthesis reaction comprises molecular oxygen in addition to the syngas. This greatly increases the carbon efficiency of the Fischer-Tropsch synthesis process, as can be derived from the significant reduction of the $CO_2$ yield.

The invention claimed is:

1. Process for producing a product stream comprising a mixture of aliphatic and aromatic $C_2$-$C_6$ hydrocarbons by Fischer-Tropsch synthesis, wherein said process comprises:
    contacting a Fischer-Tropsch catalyst with a reformed gas to form the product stream comprising the mixture of the aliphatic and aromatic $C_2$-$C_6$ hydrocarbons;
    wherein the reformed gas is produced by autothermal dry reforming of a hydrocarbon feed in the presence of a reforming catalyst; and
    wherein said reformed gas essentially consists of syngas ($H_2$ and CO), oxygen ($O_2$) and optionally a further component selected from the group consisting of methane ($CH_4$), carbon dioxide ($CO_2$) and inert gas.

2. The process according to claim 1, wherein said inert gas is nitrogen ($N_2$).

3. The process according to claim 1, wherein said product stream further comprises methane ($CH_4$) and carbon dioxide ($CO_2$) which is recycled to the hydrocarbon feed from which the reformed gas is produced.

4. The process according to claim 1, wherein said reformed gas comprises 0.1-5% mole oxygen ($O_2$).

5. The process according to claim 1, wherein said reformed gas has a hydrogen ($H_2$) to carbon monoxide (CO) ratio of 1-4.

6. The process according to claim 1, wherein said reforming catalyst is selected from the group consisting of Ni/$La_2O_3$ catalyst; Ni/$Al_2O_3$ catalyst; and Ni/MgO—$Al_2O_3$ catalyst.

7. The process according to claim 1, wherein said autothermal dry reforming is performed at a reaction temperature of 680° C.-710° C. and a contact time of 0.4-1 seconds.

8. The process according to claim 1, wherein said Fischer-Tropsch catalyst is a Co—Fe catalyst that is supported on $SiO_2$.

9. The process according to claim 1, wherein said Fischer-Tropsch synthesis is performed at a reaction temperature of 275-350° C. and a space velocity of 400-1200 $h^-$.

10. Process for producing a product stream comprising a mixture of aliphatic and aromatic $C_2$-$C_6$ hydrocarbons by Fischer-Tropsch synthesis, wherein said process comprises contacting a Fischer-Tropsch catalyst with a reformed gas that is produced by autothermal dry reforming of a hydrocarbon feed in the presence of a reforming catalyst and wherein said reformed gas essentially consists of syngas ($H_2$ and CO), oxygen ($O_2$) and a further component selected from the group consisting of methane ($CH_4$), carbon dioxide ($CO_2$) and $N_2$ gas; wherein said product stream further comprises methane ($CH_4$) and carbon dioxide ($CO_2$).

11. The process according to claim 10, wherein the methane ($CH_4$) and the carbon dioxide ($CO_2$) are recycled to the hydrocarbon feed from which the reformed gas is produced.

12. The process according to claim 10, wherein said reformed gas comprises 0.1-5% mole oxygen ($O_2$).

13. The process according to claim 10, wherein said reformed gas has a hydrogen ($H_2$) to carbon monoxide (CO) ratio of 1-4.

14. The process according to claim 10, wherein said reforming catalyst is selected from the group consisting of Ni/$La_2O_3$ catalyst; Ni/$Al_2O_3$ catalyst; and Ni/MgO—$Al_2O_3$ catalyst.

15. A process for producing a product stream comprising a mixture of $C_2$-$C_6$ hydrocarbons, comprising:
    autothermal dry reforming of a hydrocarbon feed in the presence of a reforming catalyst to form a reformed gas consisting essentially of syngas ($H_2$ and CO), oxygen ($O_2$) and optionally a further component selected from methane ($CH_4$), carbon dioxide ($CO_2$), and inert gas;
    contacting a Fischer-Tropsch catalyst with the reformed gas to form the product stream comprising the mixture of $C_2$-$C_6$ hydrocarbons.

16. The process of claim 15, wherein the product stream further comprises methane ($CH_4$) and carbon dioxide ($CO_2$) which are recycled to the hydrocarbon feed.

\* \* \* \* \*